(12) United States Patent
Peters

(10) Patent No.: US 9,056,406 B2
(45) Date of Patent: Jun. 16, 2015

(54) METHOD OF CREATING MULTILAYERED PRODUCTS THROUGH THE FOLDING OF CONTINUOUS LAYERS

(71) Applicant: GUILL TOOL AND ENGINEERING, CO. INC., West Warwick, RI (US)

(72) Inventor: Robert Peters, West Warwick, RI (US)

(73) Assignee: Guill Tool & Engineering Co., Inc., West Warwick, RI (US)

( * ) Notice: Subject to any disclaimer, the term of this patent is extended or adjusted under 35 U.S.C. 154(b) by 0 days.

(21) Appl. No.: 14/084,601

(22) Filed: Nov. 19, 2013

(65) Prior Publication Data

US 2014/0151922 A1 Jun. 5, 2014

Related U.S. Application Data

(60) Provisional application No. 61/728,213, filed on Nov. 19, 2012.

(51) Int. Cl.
*B29C 47/00* (2006.01)
*B29C 47/06* (2006.01)
*B29C 47/26* (2006.01)

(52) U.S. Cl.
CPC .......... *B29C 47/003* (2013.01); *B29C 47/0014* (2013.01); *B29C 47/0023* (2013.01); *B29C 47/062* (2013.01); *B29C 47/065* (2013.01); *B29C 47/26* (2013.01)

(58) Field of Classification Search
CPC ..................................................... B29C 47/003
USPC ................ 264/280, 210.1, 209.8, 209.3, 479
See application file for complete search history.

(56) References Cited

U.S. PATENT DOCUMENTS

| 2009/0233052 A1* | 9/2009 | Thuot et al. ................... 428/159 |
| 2011/0015416 A1* | 1/2011 | Ueyama et al. .................. 554/63 |
| 2012/0013043 A1* | 1/2012 | Weber et al. ................... 264/317 |

* cited by examiner

*Primary Examiner* — Jacob Thomas Minskey
(74) *Attorney, Agent, or Firm* — Ziegler IP Law Group, LLC

(57) ABSTRACT

A method for the creation of a plurality of continuously folded layers. This approach for creating multilayered products begins with a typical flow channel for a product in which the cross-section of this flow channel is an annular ring. The flow channel is then morphed to create folds in the flow channel. Fold patterns are manufactured into the channel walls so as to gradually modify the contour of the stream. These folds are oriented and propagated in such a way so that the flow can be converged back to a flow passage with a typical cross section but now with a multiplied number of layers. This process may be repeated to multiply the number of layers. The number of folded layers can include 3-10 layers, ten to hundreds of layers and ten to thousands of layers. The layers remain continuous around the product.

13 Claims, 2 Drawing Sheets a  b  c  d

METHOD OF CREATING MULTILAYERED PRODUCTS THROUGH THE FOLDING OF CONTINUOUS LAYERS

FIELD

The present disclosure generally relates to extrusion die systems. In particular, the present disclosure relates to multilayer/multicomponent tubular extrusion of materials by folding processes of one or more stream(s) to generate new geometries. The products of these folded streams may comprise layers and small sized grain features, in the range of mili, micro and nanosized grains, in tubular shape.

BACKGROUND OF THE INVENTION

Multilayer co-extrusion methods have pioneered many unique design possibilities in the world of plastics. There are many established technologies for the creation of flat films. Such technologies generally utilize a feed-block which will either create the layers of polymer through layer by layer addition or create a layer pattern and then multiply it through a layer multiplication technique, or through some combination of the two. Since these outputs are flat films additional steps are required to convert the exudate into tubular shapes. New methods for creating tubular shapes are needed.

SUMMARY OF THE INVENTION

The present invention relates to methods for the creation of a plurality of continuously folded layers. This approach for creating multilayered products begins with a typical flow channel for a product (see FIG. 1 in which the cross-section of this flow channel is an annular ring). The flow channel is then morphed to create folds in the flow channel (steps (a) to (c)). Fold patterns are manufactured into the channel walls so as to gradually modify the contour of the stream. These folds are oriented and propagated in such a way so that the flow can be converged back to a flow passage with a typical cross section but now with a multiplied number of layers (step (c) to (d)). This process may be repeated to multiply the number of layers. Specific embodiments of folded layers include 3-10 layers, ten to hundreds of layers and ten to thousands of layers. One advantage of this method of layer multiplication over others is that the layers remain continuous around the product. Other examples of folding geometries are depicted in FIG. 2.

BRIEF DESCRIPTION OF THE DRAWINGS

The aspects of the disclosed embodiments will be described in reference to the figures, in which.

DETAILED DESCRIPTION OF THE DISCLOSED EMBODIMENTS

Figure 1:
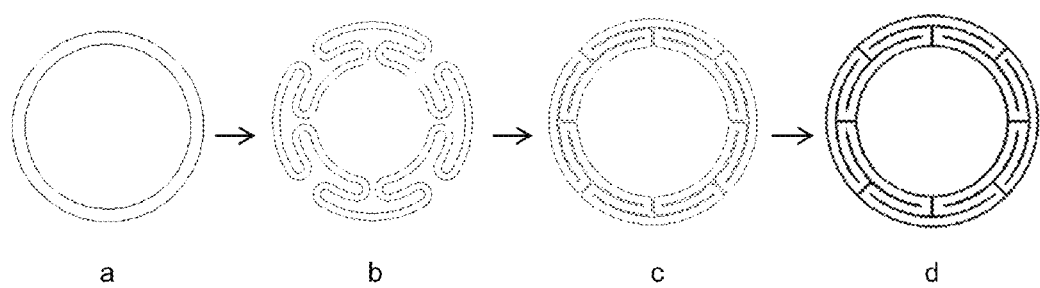
FIGS. 1a-d illustrate the stages of folding layers in a multilayered product.
Figure 2:
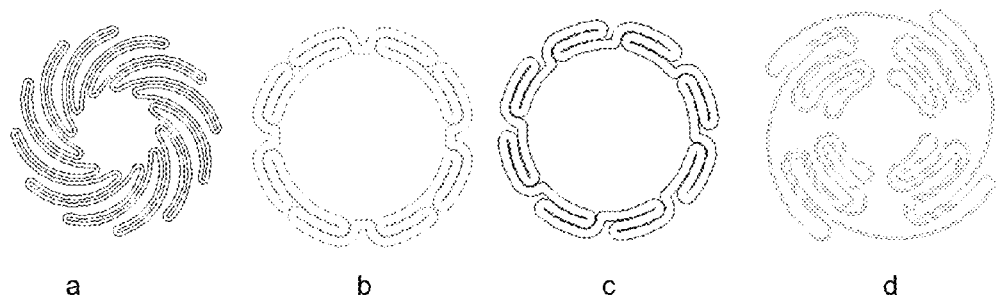
FIGS. 2a-d illustrate examples of folding geometries of layers in a multilayered product.
Figure 3:
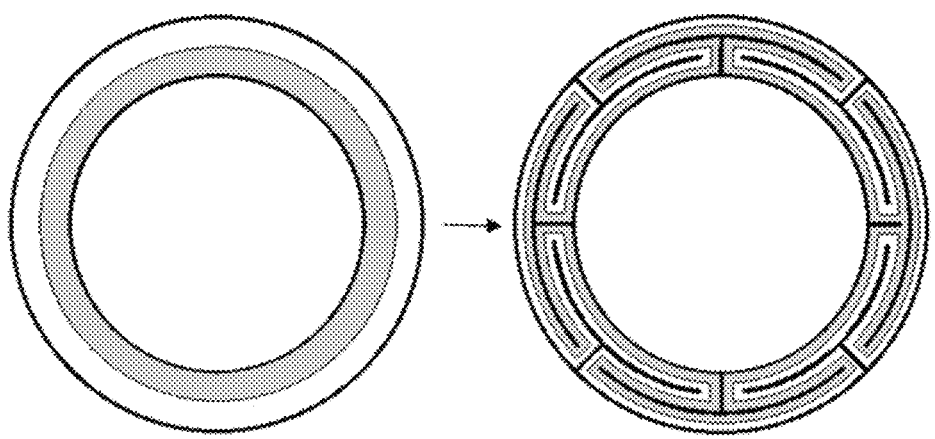
FIG. 3 illustrates a two-layer tube folded into a six-layer tube.

The initial flow may contain any number of suitable materials in any number of layers and the layer multiplication process can be performed multiple times. The number of folds and the relative length that they stretch can also vary. FIG. 3 illustrates a two layer tube folded into a 6 layer tube. If the process were to be repeated, thousands of layers could be made.

Figure 4:
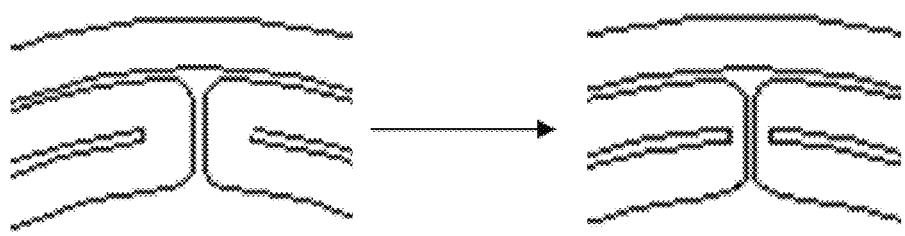
FIG. 4 illustrates a fold which can be made to have a differential thickness.

Different sections of the folds may also be made to differential thicknesses if desired. For example, if annular layers are desired, sections of a cross section where layers of materials would be more vertically oriented could be tightened or pinched off completely, as illustrated in FIG. 4.

A folded stream of material could be of any profile including any geometries including annular, triangular, square, fan, forming a tube, rod or be deposited onto some substrate. A folded stream of material(s) could also be part of a larger assembly of materials. Other materials could be layered onto or beneath the now folded stream. These materials themselves may have gone through a folding process. The stream of folded material(s) could also pass through other flow manipulations such as merging side by side with other streams of materials or passing through a deflector to form more complex layer geometries.

Figure 5:
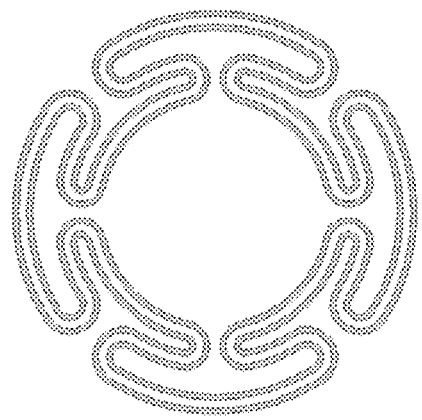
FIG. 5 illustrates a multilayered product wherein two separated nested streams are folded.

During the folding process, it is possible that another material(s) or substrate, such as a wire, could be introduced between folds. This material could become enclosed in the folding material or protrude as it progresses to the final desired shape. Similarly, multiple folding streams could be nested within each other with folds entangled, such as depicted in FIG. 5 wherein two separated nested streams are folded One advantage of the folding method of layer multiplication is the ability to stagger seams throughout the thickness of the cross section. The interface of where layers or flows of polymer come together can naturally be a weak spot due to the nature of the polymer molecules. In the extrusion of tubular plastic products, there is often a seam or seams straight through the cross section of the product where flow rejoins with itself to form a tubular shape. Through the folding process, this seam may now be reinforced with sections of plastic flow without such a seam through the thickness of the layer.

Expanding Product

With this method of layering materials, an expandable tube or profile can be manufactured by allowing the interface of the layering to be the first mode of failure. Alternatively, a skin layer or skin layers of a weak or removable material can be applied before the folding process. The weak spot or weak layer would be the first to break or stretch when the stress due to internal pressure gets too high. If the product were flexible enough, it would unfold and expand. One potential use for an expanding tube would be to prevent catastrophic failure with a controlled mode of failure to relieve pressure. It could also potentially be used as a stent. Another use could be a tube that would shrink upon the release of pressure such as a garden hose.

Microlayer Products

Another embodiment of the invention relates to products made in this manor containing multiple layers of varying components.

Another embodiment relates to products containing filler particles or fibers. Certain products contain filler particles or fibers aligned along the extrusion axis.

Another embodiment relates to products wherein the fibers are carbon fibers, more specifically carbon nanotubes.

Extrusion of the folded layers allows for enhanced alignment of filler particles or fibers along the direction of the extrusion. Filler particles are mostly restrained within each layer and as these layers approach a magnitude of size similar to the fiber or particle size, shear stresses align particles in the direction of the extrusion. Fillers may also include particles, flakes or crystals, such as metal flakes including tin, gold, and iron; wood pulps or ceramics.

Fibers include single or multiple fibers. Multiple fibers comprise a myriad of arrangements. Some exemplary arrangements include yarns, a tow of fibers or yarns, a weave, a non-woven, chopped fiber, a chopped fiber mat (with random or ordered formats), or combinations of these formats. The chopped fiber mat or nonwoven may be stretched, stressed, or oriented to provide some alignment of the fibers within the nonwoven or chopped fiber mat, rather than having a random arrangement of fibers.

Fibers also generally possess an average aspect ratio of 10-3000 and more commonly are fibers having an average aspect ratio of 20-1000. Aspect ratios of 20-350 and 50-200 are specific embodiments. Various types of organic and inorganic fibers are suitable either in monofilament or stranded form (including bundles of fibers bonded together to make a single element which serves as a single fiber in the sense of orientation and reinforcement).

Filler particles or fibers include wood fibers (including groundwood, thermomechanical pulp (TMP) and bleached or unbleached kraft or sulfite pulps), vegetable fibers (including cellulose, lignin, cotton, hemp, jute, flax, ramie, sisal and bagasse), animal fibers (including proteinaceous strands such as silkworm silk, spider silk, sinew, catgut, wool, sea silk and hair such as cashmere wool, mohair and angora, fur such as sheepskin, rabbit, mink, fox, or beaver), other synthetic polymeric fibers (including rayon, modal, Lyocell polyamide nylon, PET or PBT polyester, phenol-formaldehyde (PF), polyvinyl alcohol fiber (PVA) vinylon, polyvinyl chloride fiber (PVC) vinyon, polyolefins (PP and PE) olefin fiber, acrylic polyesters, pure polyester, aromatic polyamids (aramids) such as Twaron, Kevlar and Nomex, polyethylene (PE), HMPE (e.g. Dyneema or Spectra), polyurethane fiber, and elastomers including spandex), metallic fibers and fillers such as those drawn from ductile metals such as copper, gold or silver and extruded or deposited from more brittle ones, such as nickel, aluminum or iron, stainless steel fibers, silicon carbide fibers, clay particles, carbon fibers or glass fibers.

Particularly important fibers include the so-called micro and nano fibers including nanocellulous fibers and synthetic nanotubules including carbon nanotubes, inorganic nanotubes and DNA nanotubes.

Fibers also include microfibers known as sub-denier fibers (such as polyester drawn to 0.5 dn). Denier and Detex fibers include fibers categorized by weight and length measurements. Fiber designs also include fibers split into multiple finer fibers. Most synthetic fibers are round in cross-section, but special designs can be hollow, oval, star-shaped or trilobal. The latter design provides more optically reflective properties. Synthetic fibers may also be crimped to provide a woven, non woven or knitted structure. Fiber surfaces can also be dull or bright. Dull surfaces reflect more light while bright tends to transmit light and make the fiber more transparent.

Very short and/or irregular fibers have been called fibrils. Natural cellulose, such as cotton or bleached kraft, show smaller fibrils jutting out and away from the main fiber structure.

Fibers alignment may also be tailored by the application of external forces such as magnetic fields.

Another embodiment of the present invention relates to extruded multilayer medical devices comprising one or more pharmaceutical product(s) or drug substances (including mixtures thereof) layered with one or more biocompatible materials that control the time release of the delivery of the drug substance.

Medical devices include catheters, stents, threads, cables (including fiber optic cables), pills, capsules, lozenges, tablets, implants, medical tubing, sheaths, clamps, sutures, tapes, sheets and endotracheal devices.

Another embodiment of the invention relates to a medical tubular device comprising: a polymeric tube containing small sized grains, nano or micro-sized features and a drug substance.

Another embodiment of the present invention is directed to extrusion products possessing electrical properties. More specifically, these extrusion products contain multilayers wherein one or more layers contain electrical conducting materials and more specifically milli, micro or nanoparticle electrical conducting materials. An extrudable metal could be used as a material to form conductive layers. Such metals could also be used with compatible plastics to form insulated layers or pathways. Aspects of the disclosed embodiments are also directed to creating and producing nanoparticle products using multilayers/multistreams (and also optionally wherein the layer may be in the micro or nano dimension) to enhance the electrical properties of the products. In one embodiment, each layer may be comprised of one or more elements that facilitate one or more of the layers to conduct electricity.

Another specific embodiment relates to an extruded multilayer polymer product comprising one or more layers possessing electrical properties. A more specific embodiment relates to a product wherein said one or more layers are milli, micro or nano size, wherein said one or more layers contain nanoparticle electrical conducting materials. More specifically wherein said product one or more electrical conducting layers are layered between nonconducting layers. Products also include batteries, capacitors and the like.

Another embodiment relates to a multiplicity of alternating layers which may be of constant, variable or Chirped gradient thickness. Layers ¼ the wavelength of incident light will constructively magnify incident light. Materials with different refractive indices may thus be layered to produce a Bragg reflector either as the 3D input or as layers in the desired product. Light reflects and refracts from each layer interface. By alternating materials of high and low refractive indexes in layers ¼ the wavelength of incident light, the reflected light will constructively interfere with the reflected light from previous layers, amplifying the reflection.

Another embodiment of the present invention is directed to extrusion products possessing enhanced optical properties. A more specific embodiment relates to a product wherein one or more layers are milli, micro or nano size. Said layers may be comprised of layers of different materials with differing refractive index. Such product could be used as a wave guide or optical fiber.

Breathability/Membrane

Another embodiment of the present invention is directed to extrusion products possessing enhanced barrier properties. A more specific embodiment relates to a product wherein one or more layers are milli, micro or nano size. Aspects of the disclosed embodiments are also directed to creating and producing micro or nanoparticle products using multilayers/multistreams (and also optionally wherein the layer may be in the micro or nano dimension) to enhance the barrier properties of the products.

Another embodiment of the invention relates to a multilayered product for the creation of a membrane.

The aspects of the disclosed embodiments can be used with any suitable extrusion die technology, including but not limited to micro and nano layer coextrusion, rotary, conventional multilayer, irregular profile and multi-layer single material die extrusion technology.

The invention claimed is:

1. A method for creating multilayered products comprising:
   passing an annular stream of material through a die channel in which a fold pattern has been manufactured into the channel wall so as to gradually modify the contour of the stream into folds; and
   generating an annular folded stream for a product by converging a continuous multiply folded flow folds in the flow channel.

2. A method according to claim 1 wherein the folding process creates three to ten continuously folded layers.

3. A method according to claim 2 wherein a single folding process creates three to ten continuously folded layers.

4. A method according to claim 2 wherein the folding process is repeated creating three to ten continuously folded layers.

5. A method according to claim 1 wherein the folding process is repeated creating ten to one hundred continuously folded layers.

6. A method according to claim 1 wherein the folding process is repeated multiple times to creates ten to one thousand continuously folded layers.

7. A method for creating multilayered products according to claim 1 wherein the continuous folds in the flow channel are of differential thickness.

8. A method for creating multilayered products according to claim 1 wherein the continuously folded stream of material could form a tube, rod or be deposited onto a substrate.

9. A method for creating multilayered products according to claim 1 wherein the continuously folded stream of material contains staggered seams throughout the thickness of the cross section.

10. A method for creating multilayered products according to claim 1 wherein the continuously folded stream of material contains fillers or fibers.

11. A method for creating multilayered products according to claim 1 wherein the continuously folded stream of material contains fillers selected from metal flakes and wood pulps.

12. A method for creating multilayered products according to claim 1 wherein the continuously folded stream of material contains multiple fibers arranged as yarns, weaves, non-woven chopped fibers, chopped fiber mat or combinations thereof.

13. A method for creating multilayered products according to claim 1 wherein the continuously folded stream of material contains micro and nano fibers selected from the group consisting of nanocellulous fibers, carbon nanotubes, inorganic nanotubes and DNA nanotubes.

* * * * *